July 10, 1951
R. KENDALL ET AL
2,560,112
THREE CONTROL SYSTEM FOR AIRCRAFT
Filed April 9, 1947
2 Sheets-Sheet 1
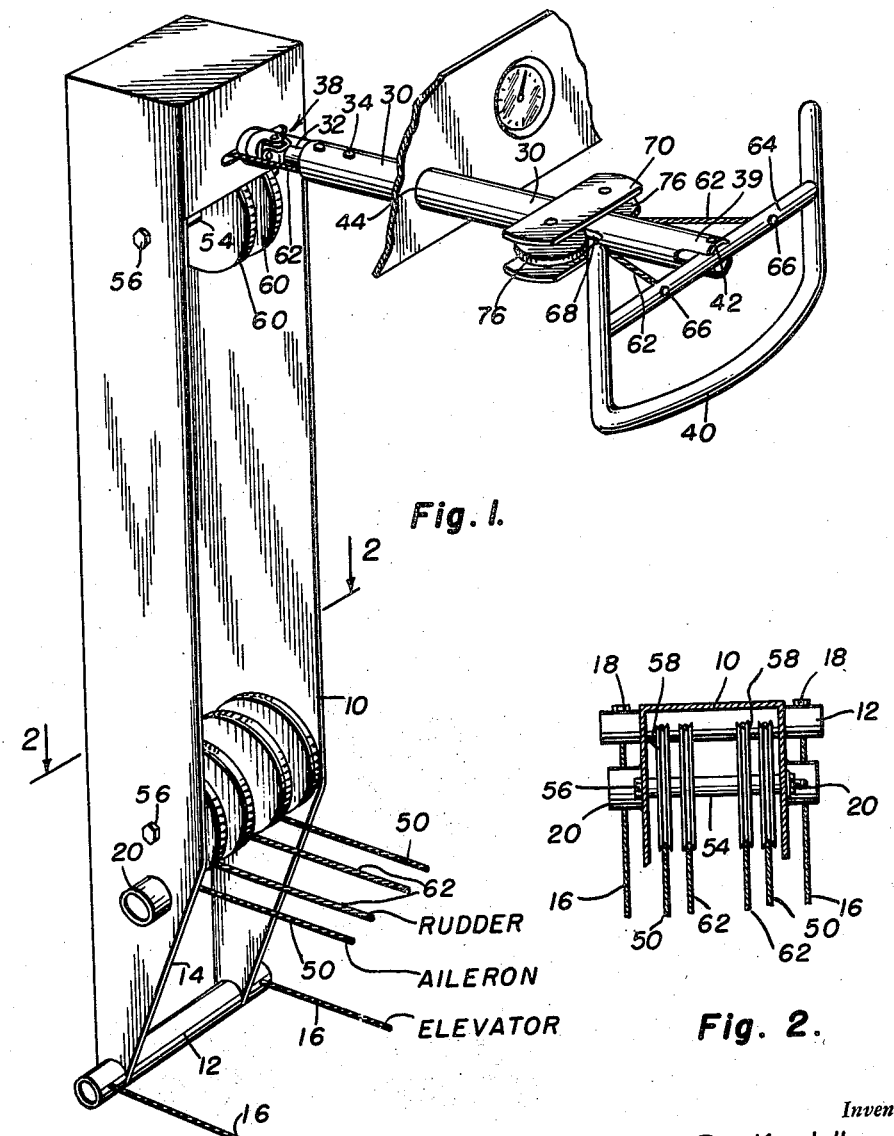
Inventor
Ray Kendall
James D. Williams
By *Clarence A. O'Brien
and Harvey B. Jackson*
Attorneys July 10, 1951  R. KENDALL ET AL  2,560,112
THREE CONTROL SYSTEM FOR AIRCRAFT
Filed April 9, 1947  2 Sheets-Sheet 2
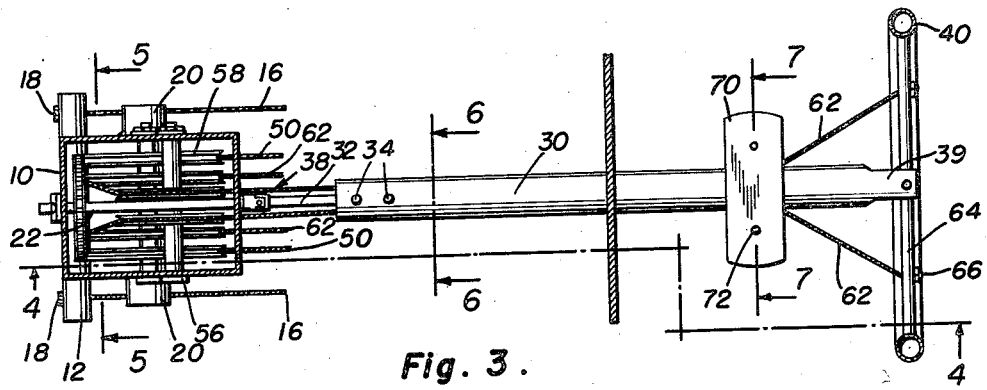
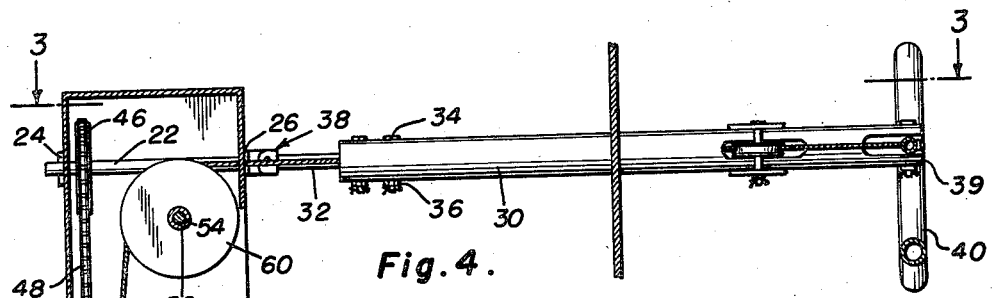
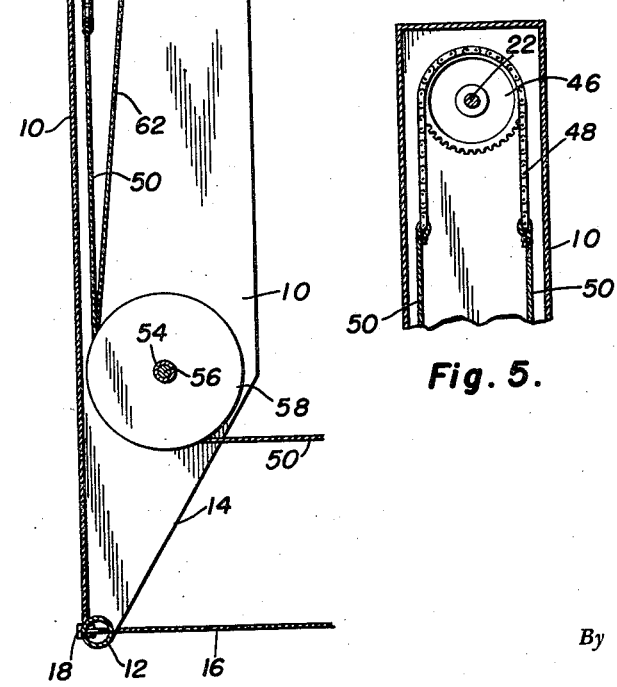
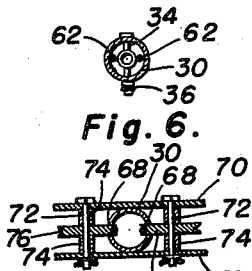
Inventor
Ray Kendall
James D. Williams
By Clarence A. O'Brien
and Harvey B. Jacobson
Attorneys Patented July 10, 1951

2,560,112

UNITED STATES PATENT OFFICE 2,560,112

THREE-CONTROL SYSTEM FOR AIRCRAFT

Ray Kendall and James D. Williams, Tulsa, Okla.;
said Williams assignor to said Kendall Application April 9, 1947, Serial No. 740,334

1 Claim. (Cl. 244—83)

This invention appertains to novel and useful control means, useful particularly in various types of aircraft.

An object of this invention is to provide housing means for controlling elevators, said means pivoted within an aircraft.

Another object of this invention is to provide improved means for controlling an aircraft rudder and improved means for controlling aircraft ailerons.

A further object of this invention is to provide banks of guide means within said housing for entraining selected portions of said rudder and aileron control means thereover.

A still further object of this invention is to provide a control means for aircraft characterized by giving the conventional control of the usual three control services by use of a single actuating means or wheel.

Ancillary objects and features of novelty shall become apparent to those skilled in the art, in following the description of the illustrated preferred embodiment of the present invention, shown in the accompanying drawings, wherein:

Figure 1 is a perspective view of the preferred form of the present invention;

Figure 2 is a transverse sectional view of the invention disclosed in Figure 1 and taken substantially on the line 2—2 thereof and in the direction of the arrows;

Figure 3 is a plan view of the preferred form of the present invention with parts shown in section as viewed on the line 3—3 of Figure 4;

Figure 4 is a longitudinal sectional view of the invention disclosed in Figure 3 and taken substantially on the line 4—4 thereof and in the direction of the arrows;

Figure 5 is a fragmentary transverse sectional view of the invention disclosed in Figure 3 and taken substantially on the line 5—5 thereof;

Figure 6 is a transverse sectional view of a detail of construction disclosed in Figure 3 and taken substantially on the line 6—6 thereof, and;

Figure 7 is another transverse sectional view of the invention shown in Figure 3 and taken substantially on the line 7—7 thereof and in the direction of the arrows.

Referring now in detail to the illustrated preferred embodiment of the present invention, like reference characters are used throughout to indicate similar elements thereof.

This invention has been developed to provide an improved control means for actuating the three usual control surfaces of an aircraft by maneuvering but a single element. By use of the present invention in present day aircraft, operation thereof is rendered relatively easy and restful. It may be appreciated that this invention contemplates actuation of all control surfaces by manual means alone, obviating the necessity for utilizing the pilot's feet.

A housing 10, composed of any suitable light material, is of substantially rectangular configuration. A tube 12 is provided at the reduced end 14 of the said housing 10. Cables 16 are secured adjacent the terminal portions of said tube 12 and said cables extend to the conventional elevator of an aircraft. Any suitable conventional means may be used for securing said cables to said tubes such as the universal joint 18, disclosed in Figure 4. Oppositely alined sleeves 20 are provided exterior of said housing 10 for pivotally mounting said housing to the interior portion of an aircraft. It is noted at this point that the elevator control cables are anchored below the pivot means 20 and accordingly movement longitudinal of the aircraft may be effected by pivoting the housing 10 about the said sleeve 20.

A shaft 22 is suitably journaled in the said housing 10 adjacent the opposite end from the reduced portion 14. This shaft 22 is provided with a pin 24 exterior of the housing 10, said pin serving as the thrust bearing. A retaining means, preferably a washer 26 may be provided exterior of said housing and adjacent the opposite end of said shaft 22 to serve the purpose of a second thrust bearing. A tube 30 is provided with a link 32 removably secured thereto and forming a substantial extension thereon. Any suitable conventional securing means may be utilized in connection with the tube 30 and extension link 32. The preferable means are conventional pins 34 extending therethrough with castle nuts 36 at one extremity thereof. A universal joint 38 is interposed between the said shaft 22 and link 32 which, obviously, provides said relative movement between the tube 30 and shaft 32 and prohibits certain other movements. This universal joint is purely conventional in nature.

A bifurcated terminal portion 39 is provided on the said tube 30 and a suitable conventional actuator or wheel 40 is utilized therewith. This actuator is pivoted between the bifurcations of said bifurcated end by a suitable pivot pin 42. It may be seen from the structure set forth hereinabove that the actuator 40 may be urged forward or backward through the instrument board aperture 44, thereby urging the upper portion of the housing 10 about the sleeve 20 as an axis.

Obviously, this movement provides elevator control movement due to the cable means 16 which are secured as described hereinabove.

Gear means, preferably a sprocket 46, is rigidly secured to the said shaft 22. A sprocket chain means 48 is entrained over said sprocket gear 46 and aileron control cables 50 are secured to each end of said sprocket chain means. These cables 50 extend to the conventional ailerons, or spoilers if so desired, for controlling the same. Referring now to Figure 2, it is seen that a sleeve 54 is received between the sides of the said housing 10 and a suitable securing means extends through said housing and in the bore of said sleeve. The usual conventional securing means may be utilized for this purpose such as a bolt 56 having pins at the end thereof. A plurality of pulleys 58 are journaled on said sleeve. It is noted that Figure 2 discloses the lower bank of pulleys and that there are four in unmber. The above mentioned aileron cables are guided over the outermost of said pulleys. It may now be appreciated that upon rotation of the actuator 40, the sprocket 46 will be turned thereby pulling and pushing cables 50 in aileron adjusting movements.

Another bank of pulleys are provided adjacent the shaft 22 and transversely thereof. The journaling means is identical to that described hereinabove for said other bank of pulleys. It will be noted however, that only two pulleys 60 are provided in this bank. Cables 62 are secured to the said actuator 40 at a suitable advantageous point such as on the cross members 64. The usual suitable conventional securing means may be utilized for this purpose, such as nuts 66. Slots 68 are provided in the tube 30 for receiving the cables 62 therein. A pair of brackets 70 are rigidly secured in parallel relation to each other. These brackets are provided on the tube 30 and a pair of shafts 72 extend transversely through said parallel brackets. Thrust bearings 74 are provided around said shafts for the purpose of holding a pair of pulleys 76 in a predetermined fixed rotatable position relative to the brackets 70. The cables 62 are adapted to be guided over said pulleys thence into the slots 68. As will be seen from an inspection of Figure 1, the said cables 62 extend into the housing 10 and are received over the pulleys 60. From this point, the cables 62 extend over the innermost pulleys of the other bank of pulleys, whereupon the said cables extend to the conventional rudder control surfaces.

Upon actuation of the actuator 40, pivotally about the pin 42 as an axis, the cables 62 may be selectively pushed and pulled thereby moving the rudder control surface to a selected desired position.

There has been described and illustrated an invention capable of performing all of the specifically mentioned objects as well as many ancillary objects. It may be seen that an aircraft may be controlled by maneuvering but a single actuator 40 in selected positions. It is noted at this point that selective control of each control surface (or sets of control surfaces) is provided thereby permitting of acrobatics or any manuever capable of being performed by the particular aircraft upon which the particular invention is employed. The obviation of both manual and foot control without sacrificing any flexibility of control has been manifested by the preferred embodiment of this invention.

While there has been described and illustrated but a preferred embodiment of the present invention, it is apparent to those skilled in the art, that various changes including omissions and additions, and rearrangement of elements may be made herein without departing from the spirit of the invention. Accordingly, limitation is sought only in accordance with the scope of the following claim.

Having thus described this invention, what is claimed as novel and improved is as follows:

Means for controlling an aircraft comprising a housing, means intermediate the ends of said housing and projecting from the sides thereof for pivotally securing said housing interiorly of an aircraft, a first bank of pulleys mounted in said housing adjacent the lower end thereof, a second bank of pulleys mounted in said housing adjacent the top end thereof, a tube secured to the lower portion of said housing beneath said first bank of pulleys and having its ends extending from the sides of said housing, means for controlling aircraft elevators, said last mentioned means being secured to said tube adjacent the ends thereof and on the exterior of said housing, a shaft mounted for rotation in said housing transversely of the rotation axis of said first and second banks of pulleys and above said second bank of pulleys, a rod, a universal joint connecting said rod and said shaft, a hollow shaft attached in concentric relation with said rod, a handle pivoted to said hollow shaft, means for controlling an aircraft rudder, said last mentioned means being secured to said handle and entrained over said first and second banks of pulleys, a sprocket attached to said shaft, a chain entrained over said sprocket, a cable for controlling aircraft ailerons attached to each end of said chain and extending around said first bank of pulleys, a bracket secured to said hollow shaft and having a pair of rotatively mounted guides disposed thereon with said rudder control means entrained therearound.

RAY KENDALL.
JAMES D. WILLIAMS.

REFERENCES CITED

The following references are of record in the file of this patent:

UNITED STATES PATENTS

| Number | Name | Date |
|---|---|---|
| 2,066,375 | Truman | Jan. 5, 1937 |
| 2,076,088 | Malinowski | Apr. 6, 1937 |
| 2,398,601 | Seifert | Apr. 16, 1946 |
| 2,413,577 | Osborn | Dec. 31, 1946 |
| 2,416,375 | Bunyard | Feb. 25, 1947 |
| 2,418,369 | Schubert | Apr. 1, 1947 |